Nov. 29, 1955  L. E. MYLTING  2,725,514
ELECTRICAL CONTROL APPARATUS FOR STOPPING ELECTRIC MOTOR
Original Filed March 18, 1947  4 Sheets-Sheet 4

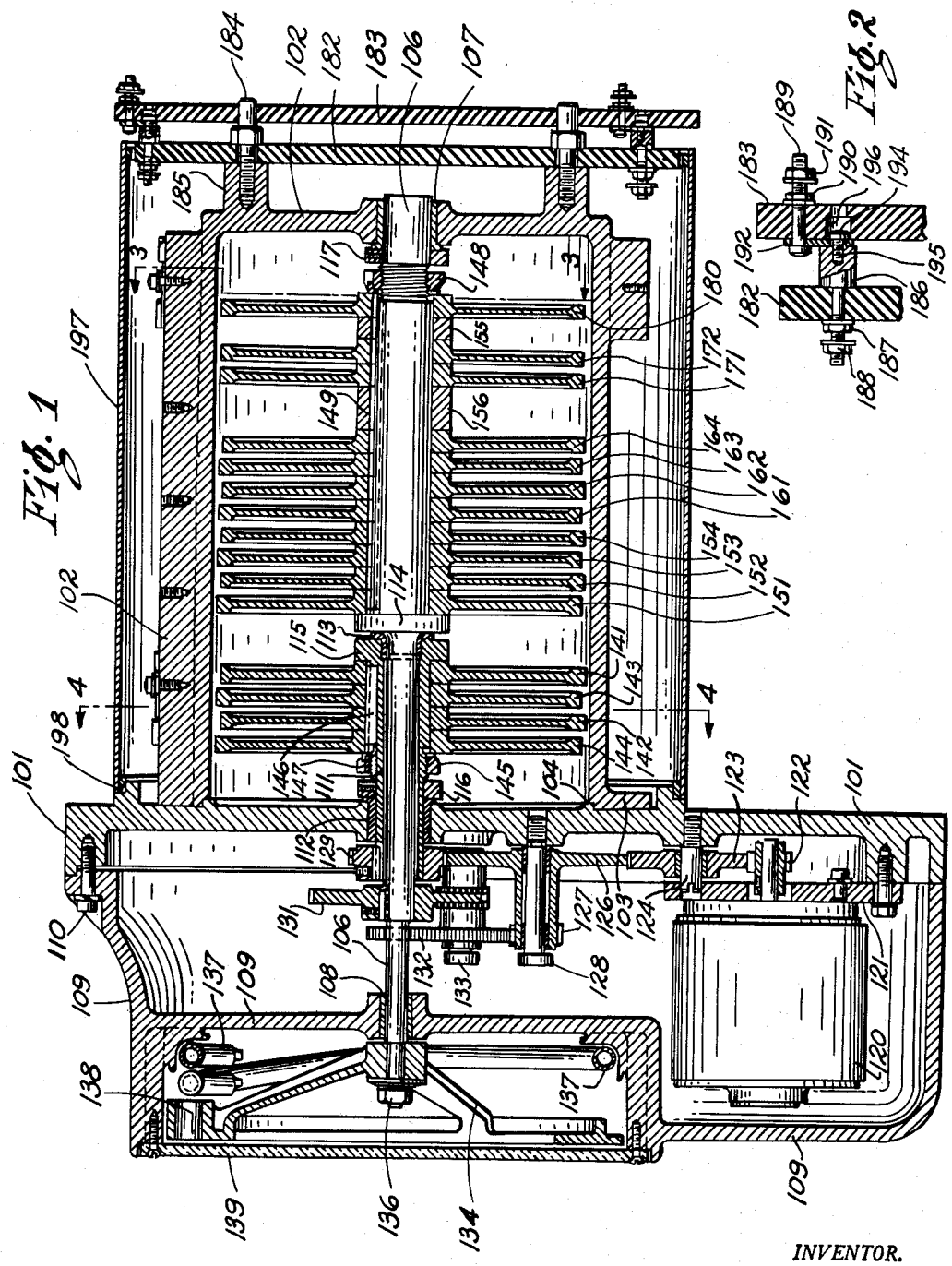

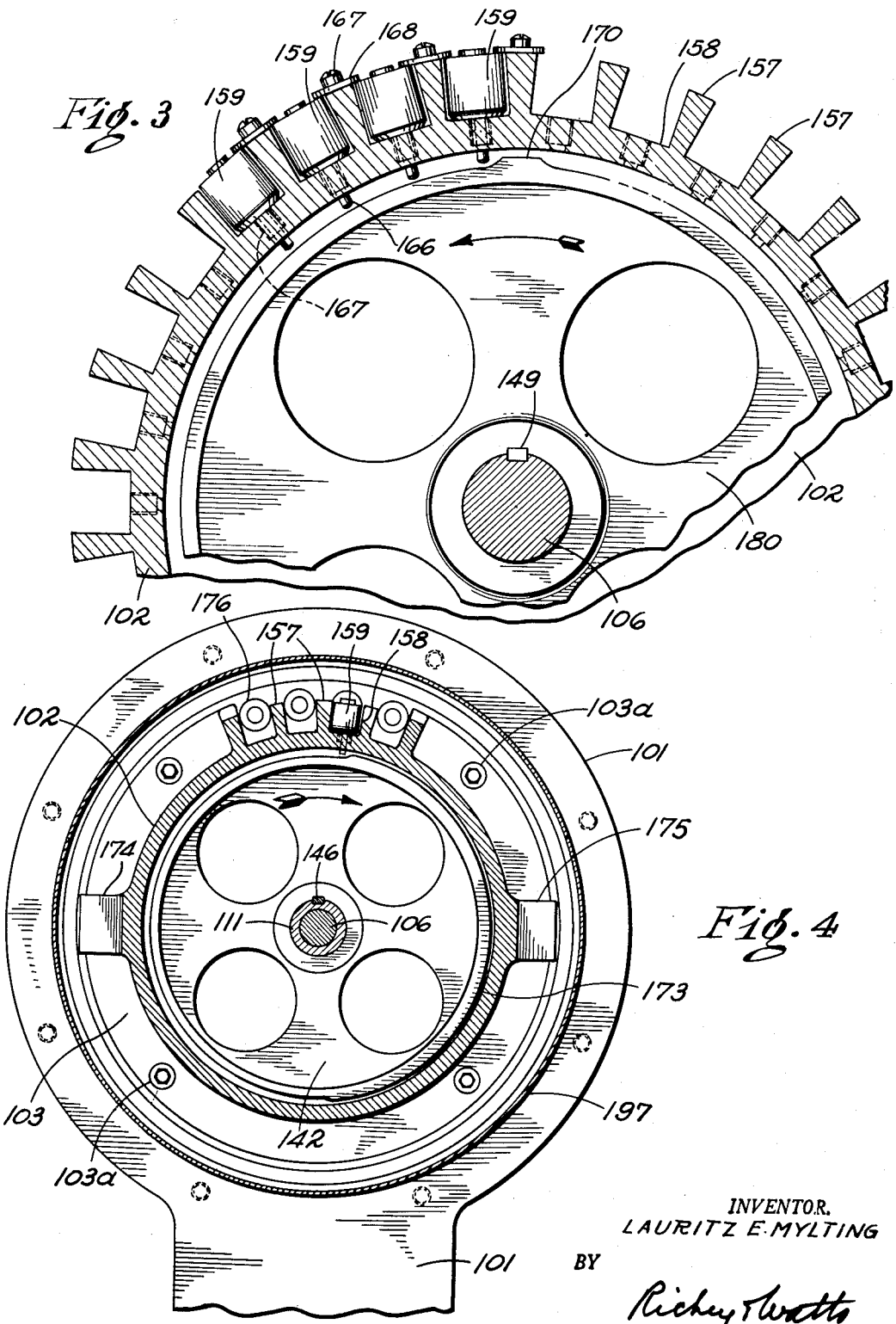

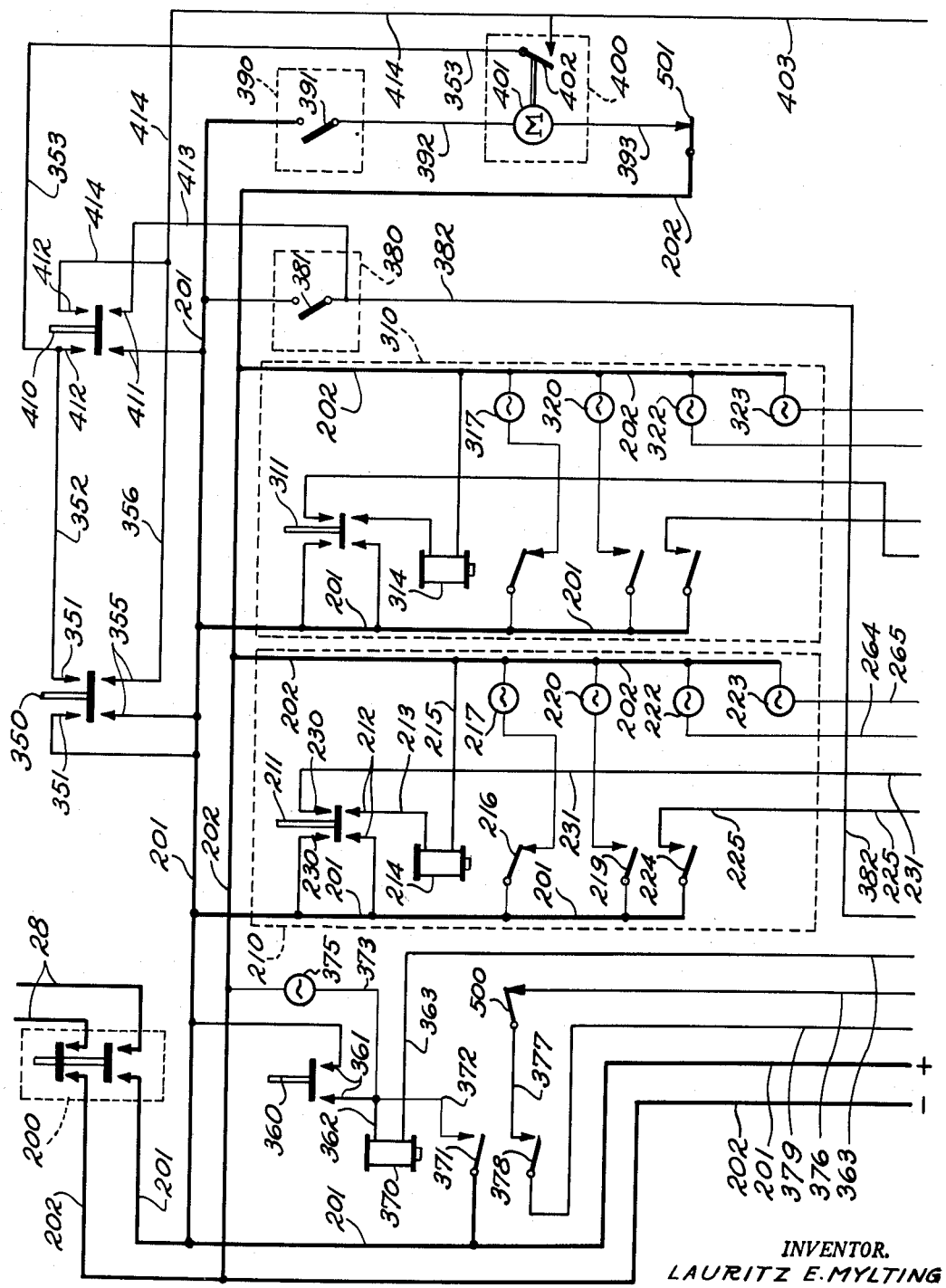

INVENTOR.
LAURITZ E. MYLTING
BY
Richey Watts
ATTORNEYS

United States Patent Office 2,725,514
Patented Nov. 29, 1955

2,725,514

ELECTRICAL CONTROL APPARATUS FOR STOPPING ELECTRIC MOTOR

Lauritz Emil Mylting, Merchantville, N. J., assignor to The Allen-Sherman-Hoff Company, Wynnewood, Pa., a corporation of Pennsylvania Original application March 18, 1947, Serial No. 735,474, now Patent No. 2,514,333, dated July 4, 1950. Divided and this application March 15, 1950, Serial No. 149,833

7 Claims. (Cl. 318—466)

This application is a division of my copending application Serial No. 735,474 filed March 18, 1947, now Patent No. 2,514,333.

In my copending application is disclosed a successful system for the disposition of ash from boilers. That system includes hoppers in which the fine ash is collected, dust valves to control the flow of ash out of the hoppers, means to open and close the valves, means to produce a vacuum in the system, and electrical control circuits and apparatus to cause the hoppers to be emptied in succession and to assure that each dust valve is kept open the requisite time to empty the corresponding hopper.

The present invention is concerned primarily with the electrical control circuits and apparatus of that system.

The objects and features of the invention will be readily apparent from a consideration of the following detailed specification, taken in connection with the drawings, in which:

Fig. 1 is a longitudinal section of an automatic materials handling control switch;

Fig. 2 is a detail of the same;

Fig. 3 is a partial, cross-sectional view taken on the plane indicated by the line 3—3 of Fig. 1;

Fig. 4 is a partial, cross-sectional view taken on the plane indicated by the line 4—4 of Fig. 1; and Figs. 5 and 6, taken together, constitute a wiring diagram of the system.

Figure 6:
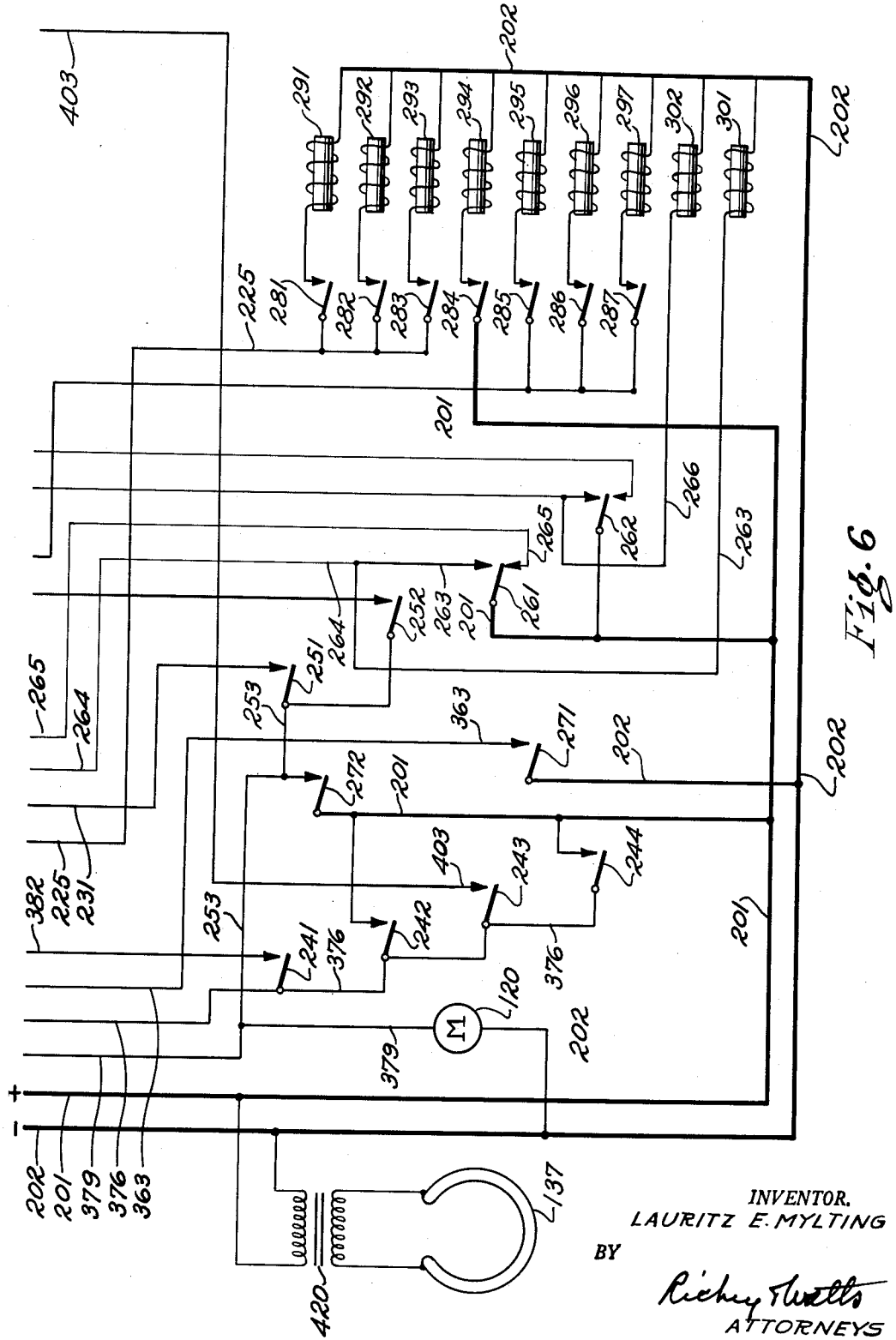

The apparatus of the invention includes as an important part thereof an automatic sequence switch, illustrated in Figs. 1 to 4. This switch effects the sequential actuation of the various elements of the system and is particularly adapted for control of the progress of an operation which is supervised or monitored by devices such as vacuum controlled switches. The control switch is of a motor-driven type, provided with a number of cams mounted on a central shaft for operation of fixed switches to control electrical actuators and provide part of the control for the switch motor. A second camshaft driven at a higher speed also is instrumental in controlling the operation of the motor.

All the parts of the control switch 100 (Fig. 1) are supported by a switch base 101, formed with a generally flat rear face which may be mounted against the front of a control panel. A cup-shaped switch frame 102 mounts the fixed switches and supports the camshaft. The frame is formed with a flange 103 extending around most of its open end, which is secured by cap screws 103a (Fig. 4) to the base 101. A pilot 104 (Fig. 1) on the base is received in a counterbore in the frame to insure exact alignment of the two parts. The low speed camshaft 106 is journalled in a bushing 107 in the end of the frame and in a bushing 108 fitted in a cover plate 109 secured to the front of the base plate by machine screws, one of which is identified at 110. The high speed camshaft 111, which is hollow and surrounds the reduced intermediate portion of the camshaft 106, is journalled in a bushing 112 fitted in the base 101 and journalled on a bushing 113 retained between a flange 114 on the slow speed camshaft and a flange 115 at the rear end of the high speed camshaft. The camshafts are restrained against axial movement by the bushing 113, a collar 116 secured to the camshaft 111 by a setscrew and engaging the inner face of the bushing 113, and a collar 117 secured to the camshaft 106 by a setscrew and engaging the inner face of the bushing 107.

The camshafts are driven by a motor 120, preferably of the single-phase capacitor synchronous type, located in the lower part of the enclosure formed by the cover plate 109. The motor is fixed to a mounting plate 121 secured to the base 101 by machine screws, and drives the camshafts through a chain of reduction gearing so designed that the shaft 111 makes 30 revolutions for each revolution of the shaft 106. The gear train comprises a pinion 122 on the motor shaft driving a gear 123 rotatable on a stud 124 extending from the switch base, which in turn drives a gear 126. The gear 126 and a pinion 127 integral therewith are journalled on a headed stud 128 screwed into the base 101. A pinion 129 keyed to the front end of the high speed shaft 111 is driven by the gear 126, and a gear 131 keyed to the slow speed shaft is driven from the pinion 127 through a speed-reducing gear and pinion unit 132 journalled on a stud 133.

The angular position of the camshaft 106 is indicated by an assembly comprising an indicator wheel 134 clamped on the reduced front end of the shaft by a nut 136. Light from an annular light source 137 mounted on the front of the cover plate 109 passes through an opening 138 in the indicator plate and illuminates a translucent dial 139 fixed in the cover plate. Numbers from one to thirty are equally spaced about the periphery of the dial 139 in position to be designated by the light passing through the opening 138.

Four radial cams 141, 142, 143, and 144 are mounted on the high speed shaft 111 between the flange 115 and a collar 145 screwed onto the shaft. The cams are held against rotation relative to the shaft by a key 146, and the collar by a washer 147 engaged in the keyway and provided with a tab which may be bent down into a groove in the threaded collar. These cams and the switches associated therewith, as will be described later, control the operation of the motor 120 so that it drives the shaft 111 through 180 degrees and the shaft 106 through six degrees at each operation of the motor.

A number of radial cams suited to the particular installation are mounted on the shaft 106. The design illustrated herein is adapted for the fitting of thirteen cams or any lesser number. For purposes of illustration, it may be assumed that cams 151, 152, 153 and 154 actuate limit switches, cams 161, 162, 163 and 164 actuate solenoid operating switches, cams 171 and 172 operate starting and homing switches for the motor, and cam 180 operates the solenoids. The purpose of these switches, and their timing will be described later.

The cams are retained on the shaft 106 between the flange 114 and a threaded collar 148 and are located angularly by a key 149. A spacer 155 equal in width to one cam is interposed between the cams 172 and 180 to provide needed clearance. A spacer 156, the length of which is determined by the number of cams mounted on the shaft, is disposed between the cams 164 and 171 to locate cam 180 in its proper position at the end of the shaft.

The cam-operated switches are mounted as follows: The upper portion of the switch frame 102 is of considerable thickness (Figs. 1 and 4) and is milled to provide five longitudinal fins 157 with switch-receiving slots 158 between the fins. The slots are spaced at an angle of twelve degrees with respect to the shafts. The entire periphery of the frame 102 at its rear and circumjacent the cam 180 is of added thickness, and is formed with a total of thirty fins 157 and slots 158, spaced at an angle of twelve degrees. The cam 180 may actuate any number of switches up to thirty, four switches 159 being shown in position in Fig. 3.

All the switches 159 are of similar construction throughout the device except that some are normally open, some are normally closed, and some are double-throw. They are of a type which is well known commercially comprising a rectangular body containing the circuit maker and breaker and having an actuating plunger 166 extending from the body. These plungers extend through holes 167 drilled radially through the frame into a position for actuation by the riser of the corresponding cam, such as cam 180 in Fig. 3. The switches are held in place by machine screws 167 and washers 168 of insulating material bearing against the outer surface of the switches. In the embodiment described herein, cam 180 is the only one which operates more than one switch. The switches operated by the other cams are mounted in the four slots 158 in the top of the frame 102, the provision of four slots permitting a staggered mounting of the switches to provide the necessary longitudinal clearance. Each cam is formed with a riser such as 170 (Fig. 3) or 173 (Fig. 4), the length of the riser being adapted to the characteristics of the system to be controlled and the function the particular cam plays in the system.

A terminal and fuse block 174 for the motor (Fig. 4) and a terminal block 175 for the dial light may be mounted on the sides of the frame 102. The leads to the motor and light are led through bushings 176 in the upper portion of the base 101. Leads from the various switches 159 and from the motor and dial light terminal blocks are connected to the circuits external to the switch through an assembly including a switch connector plate 182 (Fig. 1) and a remote connector plate 183. The switch connector plate 182 is secured to the rear end of the frame 102 by studs 185 extending from the frame. The outer ends of the studs 184 are cylindrical and serve to locate the remote connector plate 183 with respect to the switch connector plate. The leads from within the switch are connected to hexagon headed terminal bolts 186 (Fig. 2) which are retained in the plate 182 by nuts 187 and are provided with second nuts 188 to hold the wire terminals. The external wiring is connected to terminal bolts 189 in the plate 183, held by the nut 190 which secures the terminal in the plate 183 and a second nut 191. A connector strip 192 is restrained under the head of the terminal 189 in position to engage the head of the corresponding terminal 186 when the two terminal plates are in juxtaposition. Connector screws 194 passing through holes in the strips 192 are adapted for engagement in tapped holes 195 in the heads of the terminals 186. The heads of the screws 194 are disposed within recessed bores 196 in the plate 183 so that they are prevented from falling out of the plate 183. When the external and internal connections have been made, it is only necessary to slip the plate 183 over the studs 184, which may be so located as to determine uniquely the angular position of the plate 183, and then tighten the screws 194. A switch cover 197, consisting of a cylinder of sheet material or the like, adapted to protect the internal wiring of the switch, is slipped over the plate 182 and against a shoulder 193 on the switch base before the external connection plate 182 is assembled onto the switch.

Referring now to Figs. 5 and 6, the description of the circuits of the present invention will be taken with illustrative reference to the dust valve control system of the parent application, to which reference has been made. The dust removal systems which utilize such controls include ash hoppers, dust valves between the hoppers and conduits, a dust collector, segregating valves for separating the hoppers or groups of hoppers during ash removal, and an aspirator for the vacuum removal of ash from the hoppers, through the conduits, to the dust collector. The dust and segregating valves may normally include pneumatic actuators which are, in turn, controlled by solenoid operated valves. In Fig. 6, the solenoids of the dust valve actuators are indicated at 291 through 297 while the solenoids of the segregating valve actuators are indicated at 301 and 302.

The ash hoppers ordinarily may be divided into boiler groups and, for the purposes of illustration, the circuits herein set forth are for the control of a series of dust valves arranged in two groups of three each with an additional single valve. The selection of groups may then be by boilers, such as by the boiler group control units 210 and 310, shown set off by dotted lines in Fig. 5. It will be apparent that the principles of the illustrative system may be readily utilized in an expanded system for the control of a greater number of dust valves, groups of dust valves and segregating valves.

A group control unit 210, 310 is installed on the control panel for each boiler group in the system. Since these units are identical only one will be described in detail. When the main conductor 200 is closed and vacuum has been established, assuming the operator wishes to empty the hoppers of boiler group one, he moves group control switch 211 to its "on" position. This switch will remain in either circuit-closing position. When moved to the "on" position the switch 211 completes a circuit through its contacts 212, conductor 213, group control relay coil 214, and conductor 215. The relay opens its back contact 216 extinguishing the "Boiler Group Off," signal light 217. The relay also closes its front contact 219, energizing the "Boiler Group On," indicator light 220. Thus, by the indicator lights 217 and 220 and corresponding indicators in the other group control units, the attendant can readily see which groups have been cut in.

Normally, the system is set up for automatic operation by means of the manual-automatic switch 350, the contact member of which may be locked in engagement with its "automatic" contacts 351 to prepare circuits which will be described presently. With the boiler group selection established and the system set up for automatic operation, the operation is initiated by closing the "Start" push button switch 360. This energizes the circuit holding relay 370 by a circuit through the switch contacts 361, wire 362, relay coil 370, wire 363, and switch 271 operated by the cam 171, the switch 271 being closed when the control switch 100 is in its starting position. Relay 370 closes its front contact 371, shunting the starting switch 360, and thus holding the relay energized, through wires 372, 362, and 363 and switch 271. The "System Energized" indicator light 375 is energized through contact 371 and wires 372, and 373.

At this time none of the dust valves or segregating valves is open, and the first operation performed by the control switch 100 is to open the group one segregating valve and number one dust valve. Since the valves should not be opened unless the proper amount of vacuum is present, the operation of the motor 120 to cause opening of any dust valve is under control of a "Vacuum High" switch 380, which is actuated by a pressure responsive device (not shown) connected to the conduits so as to close the switch contacts 381 whenever the degree of vacuum in the system is such as normally should obtain with the aspirator in operation and all the dust valves closed. On closing of the vacuum high switch contacts 381, a circuit is closed through wire 382, contact 241, which is held closed by the cam 141 when the control switch 100 is in its starting position, wire 376, a normally closed switch 500, wire 377, front contact 378 of relay 370, and wire 379 to the motor 120. The motor thus begins to operate and drives the cam 180 at low speed, the cam lift moving toward the plunger of the switch 281 controlling the solenoid 291 of dust valve number one. The motor also drives cam 161 toward the position in which it operates switch 261 to energize the solenoid 301 of segregating valve number one which controls the flow of material from dust valve number one. Before the solenoids 291 and 301 are energized, the cam 142 on the high speed shaft closes its contact 242. This contact, which closes after 15° rotation of the high speed cam shaft 111 and remains closed until 180 degrees rotation is completed, is provided to insure that the motor drives the cam shaft 111 through a full half turn and the cam shaft 106 through six degrees, although the vacuum drops off as the valves are opened. Switch 242 simply shunts the vacuum high switch, providing a circuit through switch 242, wire 376, switch 500, wire 377, contact 378, and wire 379 to the motor. Subsequent to the closing of switch 242, switch 241 opens under rotation of the cam, and after 180 degrees rotation of the cam shaft 111, contact 242 opens, deenergizing the motor.

At this time switches 281 and 261 have been closed to energize valve solenoids 291 and 301. Switch 261 by closing its normally open contact completes a circuit through wires 263 and the solenoid 301 and a circuit through wires 263 and 264 to a "Segregating Valve Number One Open" indicator light 222. At the same time, switch 261 extinguishes a "Segregating Valve Number One Closed" indicator light 223 which is energized through the normally closed contact of switch 261 and wire 265. The indicator lights 222 and 223, and similar indicator lights of the other groups, show at all times the open or closed condition of the segregating valves. The energizing circuit for all the dust valves in group number one is prepared by front contact 224 of group number one control relay 214 whenever that group is selected. The circuit is through contact 224 and wire 225 to the individual switches 281, 282, and 283 which control the group one dust valve solenoids. Thus, when the lift of cam 180 closes the first switch 281, solenoid 291 is energized. With the electrical apparatus in this condition, the system is in condition for the removal of ash from number one hopper. As long as the hopper contains ash which is being transported by the system, a considerable vacuum will be present in the system.

However, when the hopper has been emptied the vacuum will decrease to a low value. In response to this condition, the control switch 100 is energized to close the first dust valve. This operation is initiated by a "Vacuum Low" switch 390 operated by a pressure responsive device (not shown) coupled to the conduit. When the vacuum is broken, the contacts 391 of the switch are closed. However, inasmuch as a temporary low vacuum condition might result from momentary arching of the material in the hopper, a time delay device 400 is installed to prevent closing of the dust valves unless the low vacuum condition persists for a predetermined time. The timer 400 is of a well-known type comprising an electric motor 401 which, through suitable mechanism, closes a normally open contact 402 only upon the expiration of a predetermined interval of time. A desirable time range for this system is from two to thirty seconds, and the timer may be set to any desired delay within this range on a basis of experience in the operation of a particular installation. The vacuum low switch closes the circuit through its contact 391, wire 392, time delay motor 401, wire 393, and a normally closed switch 501. After its preset period of operation, the motor 401 completes a circuit through contact 351 of the manual-automatic switch, wires 352 and 353, contact 402, wire 403, switch 243 closed by the rotary switch cam 143, wire 376, switch 500, wire 377, contact 378, and wire 379 to the motor 120. The contact 243 is closed by the rotary switch shortly before the completion of the first 180 degrees rotation of the cam shaft 111, and remains closed until after switch 244 is closed by the cam 144 at 195 degrees rotation from the starting point. Timer switch 402 and cam switch 243 thus initiate operation of the motor, and switch 244 maintains the motor in operation, regardless of the vacuum condition of the system, until the completion of 360 degrees rotation of the high speed cam shaft. The motor is energized through switch 244, wire 376 and the remainder of the circuit just traced, the switch 244 shunting the manual-automatic switch and timer switch. Switch 244 opens after 360 degrees rotation, at which time switch 241 has been closed, preparing the previously traced circuit through the vacuum high switch for the next cycle of operation.

As the motor rotates the high speed cam shaft through its second half turn the low speed cam shaft is rotated from its 6 degree to its 12 degree position and cam 180 opens switch 281, deenergizing solenoid 291 and causing the closing of the number one dust valve. When the dust valve closes, the vacuum in the system increases and the vacuum high switch initiates operation of the motor to open dust valve number two by the action of the cam 180, switch 282, and solenoid 292. The operation thus continues until all the hoppers of group one have been emptied. As the final solenoid 293 of group one is deenergized, completing the emptying of all the hoppers tributary to the number one segregating valve, cam 161 releases switch 261, deenergizing solenoid 301, closing the segregating valve, extinguishing the valve open indicator light 222, and energizing the valve closed light 223.

The segregating valve circuits pass only through the cam-operated switches 261 and 262, and thus the segregating valves are opened in succession as the cam shaft 106 proceeds through its cycle regardless of the setting of the group control units 210, 310, and the like. However, if one group of hoppers is not to be emptied the dust valves of the group will remain closed and there will be no loss of vacuum in the system. Unless means were provided to cause the motor to operate through the positions of the low speed cam shaft corresponding to that group, the motor would remain deenergized, after completing the first half cycle of rotation of the high speed cam shaft after entering the group. In order to operate the motor through an unselected boiler group, the selector switch 211 in its "off" position closes a circuit through its contacts 230, wire 231, boiler group limit switch 251, wire 253, wire 379 and motor 120. The limit switch 251 is held closed by the cam 151 on the low speed shaft during that portion of its rotation which corresponds to the opening of the individual dust valves of group one.

After the completion of group one, the control switch cam 180, as soon as vacuum is restored to the system, is operated to close switch 284 and energize solenoid 294 to open the fourth dust valve. It should be noted that this valve is not a member of either group and the energizing circuit for the solenoid proceeds directly from the supply line 201 through the switch 284. This valve will thus be opened regardless of the position of the group controls. Valve number four illustrates the manner in which a valve may be made independent of the group controls if it is desired that the valve be opened during each ash removing cycle. Assuming that number four hopper is in the pipe grouping of the second segregating valve it is necessary for this valve to open as the dust valve opens. Therefore, at this time switch 262 is operated by cam 162 to energize the solenoid 302 of the second segregating valve through wire 266.

When the number four hopper is emptied, the motor will proceed as before, under the control of the vacuum low and time delay switches to deenergize solenoid 294 and proceed with the energization of solenoids 295, 296, and 297 which actuate the dust valves of group number two. If the group two control switch 311 is in its "on" position, the setup for group two is identical to that for group one, and therefore it is unnecessary to describe the operation. The limit switch 252 completes a circuit to run the motor and cam shaft through group two in case hat group is not selected, acting in the same manner as switch 251 of group one. Obviously, additional groups may be taken care of by the system by the utilization of additional cams in the switch 100, which, as illustrated in Fig. 1, is provided with sufficient cams for the operation of four groups. Any desired number of dust valves may be included in each group and the total number of dust valves, with the switch as shown in Fig. 1, may be any number up to 30. The length and position of the lifts of the cams on the low speed shaft must be adapted to operate the segregating valves and the limit switches 251 and 252 during that portion of rotation of the cam shaft in which the dust valves belonging to the particular group are actuated.

When the switch reaches the position corresponding to closing of the last material handling valve, which in the illustrated system with seven valves would be after 84 degrees rotation of the main camshaft, cam 172 closes the homing switch 272, energizing the motor directly through switch 272 and wires 252 and 379 to return the main camshaft to its zero position, at which point the switch 272 is opened by the cam. After switch 272 closes, the normally closed switch 271 is opened by the cam 171, breaking the holding circuit for the relay 370, which drops out. Switch 271 is closed shortly before the low speed camshaft reaches its zero position, preparing the holding circuit for relay 370 through wire 363. However, the circuit is open at contact 371 of the relay. As the main camshaft is returned to its starting position, switch 272 opens, deenergizing the motor and leaving the system in condition to be restarted when desired by actuation of the "Start" push button 360.

In the event of a power failure during the operation of the system, all the valve solenoids will be deenergized and the valves will close. The control switch will remain in whatever position it was in at the time of the power failure. When the supply of power is reestablished, the valves are reopened, but in order to start the motor it will be necessary to operate the "Start" button 360 to reenergize the relay 370. This condition will be indicated by the fact that the indicator light 375 will remain extinguished until the system is restarted. When the "Start" button is operated the system will resume operation and complete its cycle.

If either the vacuum high switch 380 or the vacuum low switch 390 should fail to operate during the cycle the operation of the control switch will be interrupted. In order to restart the control switch the attendant may operate a "Jog" switch 410 which is a normally open two-way push button switch. When the switch button is depressed, it closes contacts 411 which shunts the vacuum high switch 381 through wire 413; and when the "Jog" switch button is pulled, it closes contacts 412 which shunt the time delay switch contact 402 through wires 353 and 414.

In case manual rather than automatic operation of the system is desired, the manual-automatic switch 350 is unlocked, opening the circuit which initiates operation of the motor 120 to close the dust valves at contacts 351. With the switch 351 open the motor 120 will operate automatically only to open a valve. In order to close the valve, the attendant must depress the button 350, closing its "Manual" contacts 355 and thus completing a circuit through wires 356, 414, and 403 to the contact 243 of the control switch through which the motor is energized for the valve-closing portions of the cycle. In manual operation, therefore, the attendant may watch a vacuum gauge installed on the control panel and press the button 350 as the gauge indicates, by loss of vacuum, the emptying of each hopper.

If the operator desires to terminate the operation of the system at any point in the cycle during automatic operation, it is only necessary to put all the group control switches, such as 211 and 311 in the "off" position. In this case, no additional valves will be opened, and the motor will run the control switch back to its starting position, being energized through the limit switches 251 and 252 and the homing switch 272. The operator may also skip certain dust valves in a particular group if he desires by watching the control switch dial which indicates the progress of the operation. Just before the motor reaches the point at which it would operate to open the valve or valves which it is desired to skip, the attendant turns the corresponding group selector switch to the "off" position. The motor will then proceed under the control of the boiler limit switch. As it reaches a position to open the next dust valve which the attendant desires to operate, he may return the group control switch to its "on" position causing the resumption of the operation of the dust valves.

The dial light 137 is energized through a transformer 420 supplied from the conductors 201 and 202 so that the dial is illuminated whenever the main contactor 200 is closed.

The type of motor which is considered most suitable for driving the control switch is energized through an external capacitor and resistor, which may be mounted within the upper part of the cover plate 109 (Fig. 1) and which have been omitted from the drawings to simplify the same. Obviously, any self-starting motor having relatively constant speed characteristics may be used to drive the switch.

It will be seen that the system, as described, provides for the automatic performance of a sequence of operations. The system provides a form of control which, after initiation, assures the completion of each operation, proceeds with the next succeeding operation, and, upon completion of the sequence, automatically terminates the operations. The system is safeguarded against faulty operation resulting from power failures and is adapted for non-automatic operation under the supervision of an attendant.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An electrical control system comprising a first condition responsive switch for initiating an operation, a second condition responsive switch for terminating an operation, a rotary sequence switch comprising two sets of cams, a motor and drive mechanism for driving a first set of the two sets of cams at some multiple of the speed of the second set, at least one of the second set of cams having a set of switches associated therewith and spaced about the circumference of the cam whereby successive switches are actuated for predetermined periods by rotation of the cam, and a first switch associated with a first cam of the first set, said switch being closed at the zero position of the cam and opening upon rotation thereof, a second switch associated with a second cam of the first set, said switch being open at the zero position of the cam and closing upon rotation thereof and remaining closed during an interval between the zero and 180 degree positions of the cam, a third switch associated with a third cam of the first set, said switch being normally open but closing during an interval about the 180 degree position of the cam, a fourth switch associated with a fourth cam of the first set, said switch being closed during an interval between the 180 and 360 degree positions of the cam, a set of solenoids for controlling apparatus to be actuated in sequence, a connection between each solenoid and a switch associated with the second set of cams, a series connection between the first switch and the first condition-responsive switch to energize the motor, a connection shunting the second switch across the first switch and the first condition-responsive switch for maintaining the motor in an energized condition throughout the first 180° of rotation of the said cams, a series connection between the third switch and the second condition-responsive element to energize the motor at the 180° position of the cam, and a connection shunting the fourth switch across the third switch to maintain the motor energized during the second 180° rotation of the cam, the said condition-responsive switches being associated with the apparatus controlled by the said solenoids, and the said solenoids being operated in sequence.

2. An electrical control system comprising a first condition responsive switch for initiating an operation, a second condition responsive switch for terminating an operation, a rotary sequence switch comprising two sets of cams driven in synchronism, the first set of cams being driven at some multiple of the speed of the second set of cams, each of the two sets of cams rotating in unison, a first switch associated with a first cam of the first set, said first switch being normally closed at the zero position of the first set of cams and opening upon rotation of the cams, a second switch associated with a second cam of the first set of cams, said second switch being normally open and closing upon rotation of the cams from the zero position and remaining closed for the first 180 degrees of rotation of the cams, a third normally open switch associated with a third cam of the first set of cams and closing only at 180 degrees of rotation of the cam and a fourth switch associated with a fourth cam of the first set and closed during the second 180 degrees of rotation of the cam, the second set of cams having a set of switches associated with each of the cams, and at least one of the cams of the second set being adapted to actuate an associated switch throughout an angle of rotation of the second set which is some multiple of the angle of rotation at which a group of the remaining switches of the second set are actuated for controlling an operation throughout the sequence of actuation of the said group of switches, and a motor for driving the cams, a set of solenoids associated with devices to be actuated and connections between each solenoid and a switch associated with the second set of cams for energizing the solenoids, and a series connection between the first switch and the first condition-responsive switch to energize the motor, the connection shunting the second switch across the first switch and the first condition-responsive switch for maintaining the motor in an energized condition throughout the first 180° of rotation of the said cams, a series connection between the third switch and the second condition-responsive element to energize the motor at the 180° position of the cam, and a connection shunting the fourth switch across the third switch to maintain the motor energized during the second 180° rotation of the cam, the said condition-responsive switches being associated with the apparatus controlled by the said solenoids, and the said solenoids being operated in sequence, and the apparatus being operable by groups and in sequence.

3. A progressive control system comprising a motor, a low speed shaft driven by the motor, a plurality of circuit contactors arranged for successive operation by the actuator, a high speed shaft driven by the motor, means responsive to a first external condition-responsive switch for starting the motor at an initial position of the high speed shaft, means actuated by the high speed shaft for stopping the motor at an intermediate position of the high speed shaft and after the actuator has engaged a circuit contactor, means responsive to a second external condition-responsive device for starting the motor at the intermediate position of the high speed shaft, and means actuated by the high speed shaft for stopping the motor at the initial position of the high speed shaft after the actuator has released the circuit contactor, whereby the circuit operators are successively actuated and deactuated by the successive operation of the first and second condition-responsive devices.

4. A progressive control system comprising a motor, a low speed shaft driven by the motor, a plurality of circuit contactors arranged for successive operation by the actuator, a high speed shaft driven by the motor, means for starting the motor at an initial position of the high speed shaft comprising a first switch, a normally open first condition-responsive device connected in series with the motor and cam means on the high speed shaft for closing the said first switch only at the initial position of that shaft, means for stopping the motor at an intermediate position of the high speed shaft comprising a second switch connected in parallel with the first switch and the first condition-responsive device and cam means driven by the high speed shaft for closing the second switch before the first switch opens and maintaining the second switch closed until the intermediate position is reached, means for starting the motor at the intermediate position of the high speed shaft comprising a third switch and a second external condition-responsive device connected in series with the motor, and cam means on the high speed shaft for holding the second switch closed while the high speed shaft is at the intermediate position, and means for stopping the motor at the initial position of the high speed shaft comprising a fourth switch connected in parallel with the third switch and the second external condition-responsive device, and cam means on the high speed shaft for closing the fourth switch before the third switch is opened and opening the fourth switch when the initial position is reached, and the actuator successively engaging the circuit contactors only during the intermediate position of the high speed shaft, whereby the circuit operators are successively actuated and deactuated by the successive operation of the first and second condition-responsive devices.

5. A progressive control system comprising a motor, a low speed shaft driven by the motor, a plurality of circuit contactors arranged for successive operation by the actuator, a high speed shaft driven by the motor, means for starting the motor at an initial position of the high speed shaft comprising a first switch, a normally open first condition-responsive device connected in series with the motor and cam means on the high speed shaft for closing the said first switch only at the initial position of that shaft, means for stopping the motor at an intermediate position of the high speed shaft comprising a second switch connected in parallel with the first switch and the first condition-responsive device and cam means driven by the high speed shaft for closing the second switch before the first switch opens and maintaining the second switch closed until the intermediate position is reached, means for starting the motor at the intermediate position of the high speed shaft comprising a third switch and a second external condition-responsive device connected in series with the motor, and cam means on the high speed shaft for holding the second switch closed while the high speed shaft is at the intermediate position, and means for stopping the motor at the initial position of the high speed shaft comprising a fourth switch connected in parallel with the third switch and the second external condition-responsive device, and cam means on the high speed shaft for closing the fourth switch before the third switch is opened and opening the fourth switch when the initial position is reached, and the actuator engaging the circuit contactors only during the intermediate position of the high speed shaft, cam means on the said low speed shaft and a normally open switch on the low speed shaft adapted to be closed by the cam and connected to the said motor for driving the actuator past any predetermined group of the said circuit contactors independently of the said condition-responsive devices.

6. In a control circuit, a drive motor, a shaft connected to said motor, a plurality of cams mounted upon said shaft, a plurality of switches each actuated by one of said cams and the cams being associated in pairs for controlling operation of the motor throughout a predetermined sector of rotation, one cam of the pair being adapted to maintain the associated switch in an actuated position only at the beginning of the sector of rotation and the remaining cam of the pair being adapted to maintain the associated switch in an actuated condition only throughout the remainder of the sector of rotation, a plurality of condition-responsive switches, one condition-responsive switch being associated with one of the pairs of the cams and connected in series with the switch operated by the said one cam of the pair and with the motor whereby the motor is started to rotate through the predetermined sector at which it is stopped when the associated condition-responsive device is actuated and the switch associated with the remaining cam of the pair being connected in shunt with the said first-named switch connected in series with the condition-responsive device for maintaining the motor in operation throughout the remainder of the sector of the said pair of cams and the said switch associated with the remaining cam being opened at the end of the sector of that pair of cams and thereupon closing the said one switch associated with another pair of cams whereby the arrangement is readied for controlled operation throughout another sector by another condition-responsive switch.

7. A progressive control system comprising a motor, a first switch operatively actuated by the motor and normally closed at a first stopping position of the motor and open when the motor is driven from that position, a first condition-responsive device and a series circuit including the motor, the first switch and the first condition-responsive device for starting the motor when the first condition-responsive device is operated, a second switch operatively actuated by the motor, normally open when the motor is at the said first stopping position and closed when the motor is driven from said first stopping position, and connections shunting the second switch across the first switch and the condition-responsive device for maintaining the motor in operation until a second stopping position is reached, whereupon the second switch is opened and the motor stopped, a third switch operatively actuated by the motor and normally closed at the second stopping position and open when the motor is driven from that position, a series circuit including the third switch, a second condition-responsive device and the motor for starting the motor when the second condition-responsive device is operated and a fourth switch operatively actuated by the motor and normally open when the motor is at the said second stopping position and closed when the motor is driven from the second stopping position toward the first stopping position and connections shunting the fourth switch across the third switch and the second condition-responsive device for maintaining the motor in operation until the motor again reaches the first stopping position whereupon the fourth switch is opened and the motor stopped.

References Cited in the file of this patent

UNITED STATES PATENTS

| | | |
|---|---|---|
| 1,773,130 | Denniston | Aug. 19, 1930 |
| 2,155,271 | Jones | Apr. 18, 1939 |
| 2,197,312 | Nelson | Apr. 16, 1940 |
| 2,427,300 | Oliver | Sept. 9, 1947 |
| 2,474,843 | Helsing | July 5, 1949 |
| 2,481,572 | Conacher | Sept. 13, 1949 |
| 2,495,530 | LaVia | Jan. 24, 1950 |